Dec. 20, 1949   B. H. LOCKE   2,491,745
VARIABLE SPEED DRIVE
Filed Oct. 7, 1946   2 Sheets-Sheet 1

INVENTOR
Burton H. Locke

Patented Dec. 20, 1949

2,491,745

UNITED STATES PATENT OFFICE 2,491,745

VARIABLE-SPEED DRIVE

Burton H. Locke, Framingham, Mass.

Application October 7, 1946, Serial No. 701,829

3 Claims. (Cl. 74—230.17)

My invention relates to improvements in variable speed drives that transmit infinite variable speed intermediate a pair of shafts; and affords a wide range of infinite variable speed by means of an adjustable V-belt drive functioning in cooperation with a set of change gears; and one object of the invention is to provide a transmission capable of transmitting constant horsepower over the entire infinitely adjustable speed range. Another object is to afford a unit capable of design to deliver wide ranges of infinitely variable speed, as required, from a constant speed input. Still another object is to afford a unit that is relatively compact in size and simple to adjust.

The first objective is accomplished by the utilization of an adjustable V-belt drive wherein the belt speed remains constant at all delivered speeds of the transmission, and to provide a means that functions with the speed adjustment thereof to increase the normal V-belt wrap on the pulleys as the adjustable pulley is decreased in diameter, thereby maintaining proper belt speed and belt contact with the pulleys to render the V-belt drive capable of transmitting constant power at all adjusted speeds thereof. The second objective is accomplished by properly utilizing speed change gears in cooperation with the adjustable V-belt drive to afford wide ranges of infinite variable transmitted speeds. The third objective is afforded by the V-belt drive being confined within a relatively narrow range, generally approximately 2 to 1, necessary to cover only the range intermediate the steps of speeds afforded by the change gears. This confines the adjustable pulley diameter to a minimum to afford a compact unit. Another means of achieving compactness is the maintenance of the drive and driven shafts on fixed centers which is afforded by the V-belt drive adjustment being accomplished by center distance variation through the medium of arculation of the driven pulley intermediate the drive and driven shafts.

The speed changes in adjustable V-belt drives now on the market are accomplished by varying the diameter of the driving pulley, either by itself by changing the center distance of the drive, or in cooperation with a change in diameter of the driven pulley in units wherein the center distance of the drive is fixed. Such drives are only capable of substantially transmitting constant torque, due to the change in speed of the V-belt and its area of contact with the driving pulley, both of which are relative to the delivered speed of the transmission.

The drive combination to be set forth can be adapted to deliver constant horsepower over a wide range of speed and would be ideally suited to drive machine tools, and the like, wherein constant horsepower is essential over wide speed ranges.

Figure 1:
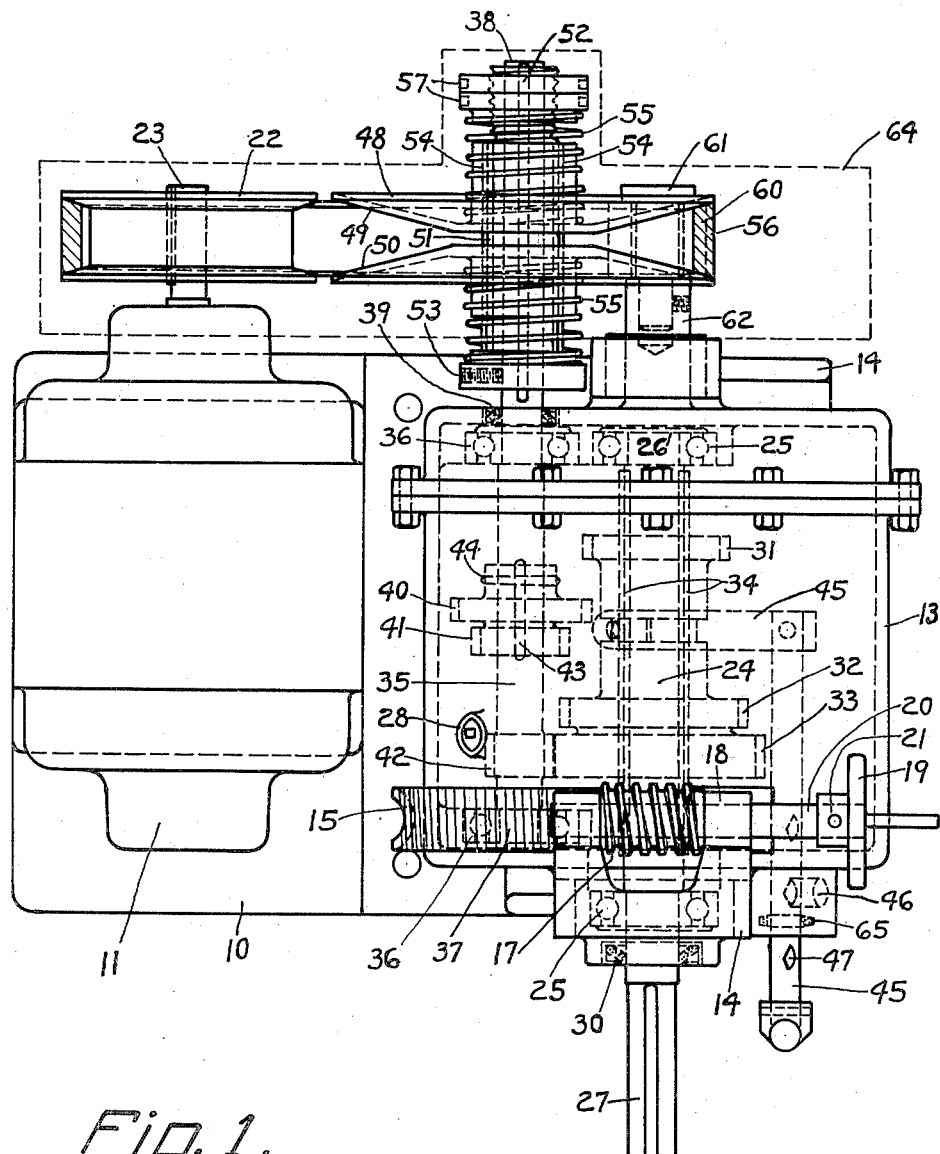
Figure 1, is a plan view of my improved variable speed drive.
Figure 2:
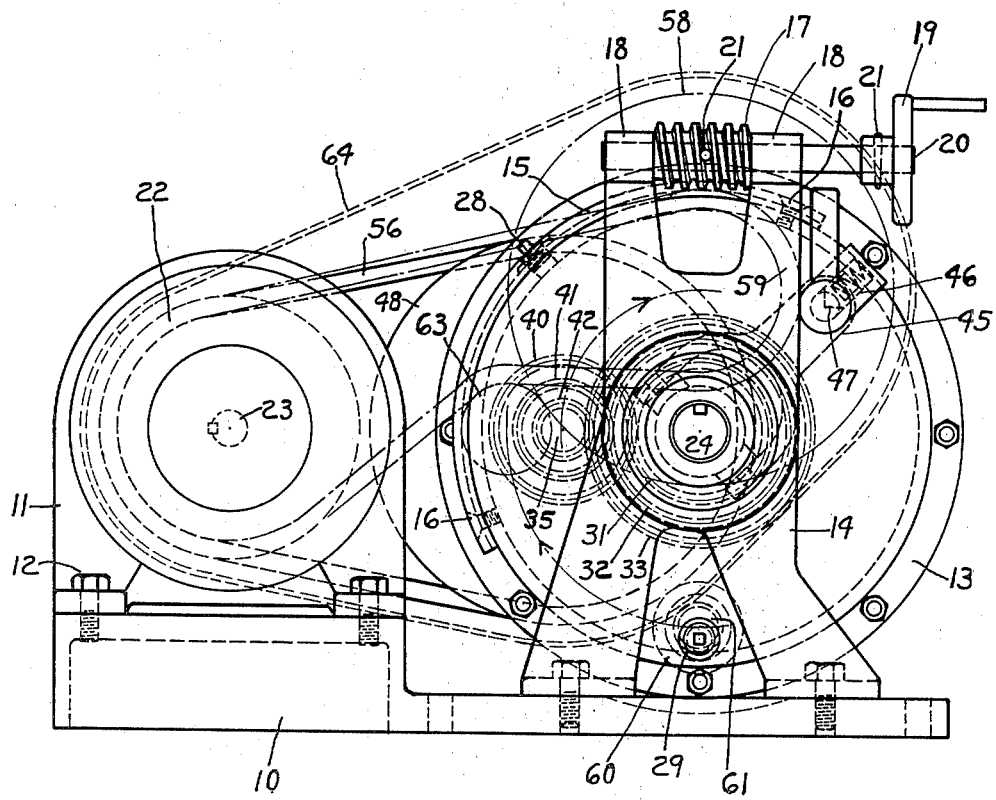
Figure 2, is a side elevation of the same.

My improved variable speed drive, as shown by the drawing, generally comprises a base plate 10 with a constant speed motor 11 rigidly attached thereto by means of cap screws, or bolts, 12. A gear case 13 is rotatively mounted on base plate 10 in trunnion supports 14 which are rigidly attached to base plate 10. Gear case 13 is generally made in two sections and bolted together, as shown, to facilitate assemblage of the parts. A worm gear segment 15 is attached to the outside of gear case 13 by means of screws 16 and meshes with a worm 17 supported in bearings 18 that are integral with one of the trunnion supports 14. Worm 17 and a handwheel 19 are secured to a shaft 20 by means of pins 21. Handwheel 19 is for the purpose of operating worm 17 and worm gear 15 to rotate gear case 13 relative to base plate 10 for a purpose hereinafter described. Worm 17 is of the so-called self-locking type for the purpose of holding gear case 13 at any adjusted position. There is a fixed diameter driving V-pulley 22 mounted on motor shaft 23 which, in this instance, is considered the drive shaft of the transmission. However, a drive shaft could be mounted on base plate 10 in place of motor 11 and pulley 22 mounted thereon without departing from the invention, and in such construction the said drive shaft would be adapted to be driven at constant speed from another source of power. Obviously, the trunnion supports on each side of case 13 would be shaped properly to eliminate interference with the protruding bosses and shafts from said case at all adjustments thereof.

A driven shaft 24 is journaled in bearings 25 which are mounted in gear case 13 concentric with the trunnion journals. The inner end 26 of shaft 24, terminates within casing 13, while the other end 27 thereof extends outside of the casing and is adapted to receive gear or pulleys, or the like, to drive other equipment. Casing 13 is generally partially filled with oil to lubricate the interior gearing and bearings and plugs 28 and 29 are provided for the purpose of adding and draining the oil, respectively. Oil seal 30 is provided on shaft 24 to prevent oil escaping from the casing. A plurality of integral gears 31; 32 and 33, having different pitch diameters to impart different speeds to shaft 24, are slidably mounted on shaft 24 and are held to rotate therewith by means of keys 34.

A countershaft 35 is journaled in bearings 36 which are mounted in gear case 13 to position said shaft parallel to driven shaft 24 and at gear center distance therefrom. One end 37, of shaft 35, terminates within casing 13, while the other end 38 thereof extends outside of the casing to receive an adjustable V-belt pulley, and an oil seal 39 is provided to retain the oil within the casing. A plurality of gears 40; 41 and 42 are either made integral with shaft 35 or are mounted rigidly thereon by means of key 43 and pin 44. Gears 40; 41 and 42 are arranged to mesh with gears 31; 32 and 33, respectively, but only one pair meshing at one time, as shown. A shifter 45 is provided to slide the gears into mesh as required and a simple means, such as spring actuated plunger 46, which springs into one of the notches 47; in shifter 45, when a pair of gears are slid into proper mesh, is provided to locate and retain the respective pair of gears in mesh, as required. Each pair of gears, being of a different ratio, afford a definite choice of speeds of shaft 24 at a constant speed of shaft 35. An oil seal 65 is provided around shifter 45 to prevent oil escaping from the casing.

An adjustable V-pulley 48 comprising two opposing cone faced discs 49 and 50 is slidably mounted on a sleeve 51, which is fastened to the extended end 38, of shaft 35, by means of key 52 and set screw 53, and held to rotate therewith by means of keys 54. The discs 49 and 50 are actuated toward each other by means of compression springs 55 to cooperate with a V-belt 56 operating over, and driven by, pulley 22 on motor shaft 23. Springs 55 are adjusted to proper operating condition by means of adjusting nuts 57 which have threaded engagement with sleeve 51.

As shown in the drawings, the V-belt drive is positioned to impart minimum speed from motor shaft 23 to shaft 35. When a faster speed of shaft 35 is desired, regardless of which change gear is being utilized, gear case 13 is rotated about its axis in the direction of the arrow by means of handwheel 20, through the medium of worm 17 and gear segment 15, which lengthens the centers of the V-belt drive thereby causing the V-belt to be pulled down to a smaller operating diameter on V-pulley 48. Maximum speed of shaft 35 is obtained when gear case 13 is rotated so that V-pulley 48 is in the position shown by broken circle 58, and at this point the V-belt is at the minimum diameter of pulley 48 as shown by broken lines 59. Obviously, the gear case can be rotated, and thus speed adjustment effected, when the transmission is in operation and the gears will remain in mesh due to the rotation of the case being concentric with one gear shaft. The intended infinite speed variation of the V-belt drive is only to the extent to bridge the gap between each successive step of speed change afforded by the change gears intermediate shaft 35 and driven shaft 24, for reason to confine the size of the adjustable V-pulley 48 within practical limits and thereby afford a compact unit.

It is obvious that an infinite speed variation can be obtained over the entire speed range of the transmission by proper manipulation of the change gears in cooperation with the adjustable V-belt drive, and that a wide range of speed can be obtained by the combined arrangement set forth.

I conceive to provide a means to increase the normal belt wrap on the pulleys as the adjustable pulley is decreased in size in order to afford ample belt contact with pulley 48 at the smaller diameters thereof to transmit the required power. The means comprises an idler 60 rotatively mounted on a stud 61 that is secured in a boss 62 integral to casing 13. At the maximum diameter of pulley 48, idler 60 has no cooperative contact with V-belt 56, however, as the casing 13 is rotated to reduce the diameter of pulley 48, for reasons set forth, idler 60 cooperatively contacts the back of V-belt 56 to effectively increase the wrap of the V-belt on the pulleys, substantially relative to the decrease in the diameter of pulley 48. The position of idler 60 at its most effective position, which is effected and essential when pulley 48 is at its minimum diameter, is shown by broken circle 63. Furthermore, the spring pressure increases as the diameter of pulley 48 decreases which affords increasing belt friction with said pulley, substantially coactive in effect, to further assure the drive of transmitting constant power at all speed adjustment.

A suitable guard 64 can be provided for the V-belt drive. A flat face pulley to operate on the inside face of V-belt 56 could be used in place of V-pulley 22 without departing from the scope of the invention. In drives wherein the transmission of constant horsepower is not essential, an adjustable pulley could be utilized on the drive shaft and a fixed diameter pulley on the countershaft 35, without departing from the other novel features set forth.

It might be found possible in some transmissions that idler 60 could be eliminated without seriously affecting the power capacity of the V-belt drive. In transmissions requiring only a small range of speed variation, the plurality of change gears shown could be eliminated and a single pair of gears employed intermediate the shaft 35 and driven shaft 24. The exact details are susceptible of modification without departing from the spirit or scope of the invention which is set forth, broadly, in the following claims.

I claim:

1. A variable speed drive comprising a stationary base, a drive shaft and a gear case mounted in fixed journaled relation thereon, said gear case being mounted for axial rotation, and means to effect and control said rotation, a driven shaft mounted in said gear case in axial concentricity therewith, and a countershaft mounted in said gear case at gear operating distance from said driven shaft, and a plurality of change gears intermediate said countershaft and said driven shaft, and means to shift said gears to effect steps of transmitted motion, and means to cooperate with said gears to effect infinitely variable transmitted motion comprising an adjustable V-belt drive intermediate said drive shaft and countershaft, said V-belt drive comprising a V-belt and a fixed pulley on the drive shaft and an adjustable pulley on the countershaft, means to adjust said V-belt drive comprising the changing of the pulley centers by the arcuate movement of said countershaft effected by the rotation of said gear case, and means to effect an increase in the normal wrap of the V-belt on the pulleys as the diameter of the adjustable pulley is diminished comprising an idler mounted on said gear case to contact the back of said V-belt as the gear case is rotated.

2. A variable speed drive comprising a stationary base, a drive shaft and a gear case mounted in fixed journaled relation thereon, said gear case being mounted for axial rotation, a driven shaft mounted in said gear case in axial concentricity therewith, and a countershaft mounted in said gear case at gear operating distance from said driven shaft, gearing intermediate said countershaft and said driven shaft, means to effect infinite transmitted motion comprising an adjustable V-belt drive intermediate said drive shaft and said countershaft, and means to adjust said V-belt drive comprising the arcuate movement of the said countershaft effected by the rotation of said gear case, and means to effect an increase in the normal wrap of the V-belt on its pulleys as the diameter of the adjustable pulley is diminished comprising an idler mounted on said gear case to contact the back of said V-belt as the case is rotated, and means to effect and control the rotation of said gear case.

3. A drive arranged to impart adjustable infinitely variable motion to a driven shaft from a constant speed drive shaft characterized by being capable of transmitting constant horsepower from said drive shaft to said driven shaft at all speed adjustments thereof wherein infinitely adjustable motion of the driven shaft may be effected, said drive comprising a fixed diameter pulley on the drive shaft and a pair of opposed cones resiliently pressed toward each other on the driven shaft and a V-belt operatively connecting said pulley and cones, means to adjust said drive so that the motion intermediate the drive and driven shafts may be varied comprising means to vary the spacing of the axis of the driven shaft from that of the drive shaft and thus cause the said belt to travel on a larger or smaller circuit of the said cones, an idler arranged to be swung into contact with the back of the said V-belt by the actuation of the speed adjusting means, said idler being disposed to effect an increase in the normal arc of belt contact with the cones substantially correlative to the decrease in the diameter of the belt circuit on the cones caused by the adjustment of the speed intermediate the said shafts.

BURTON H. LOCKE.

REFERENCES CITED

The following references are of record in the file of this patent:

UNITED STATES PATENTS

| Number | Name | Date |
| --- | --- | --- |
| Re. 22,875 | Grimm | May 6, 1947 |
| 425,390 | Rice | Apr. 8, 1890 |
| 2,092,469 | Oslund | Sept. 7, 1937 |
| 2,107,483 | Knight | Feb. 8, 1938 |
| 2,168,744 | Perrine | Aug. 8, 1939 |
| 2,193,251 | Johnson | Mar. 12, 1940 |
| 2,200,101 | Schmitter | May 7, 1940 |
| 2,209,046 | Baker | July 23, 1940 |
| 2,248,948 | Bowers | July 15, 1941 |